(12) United States Patent
Gui et al.

(10) Patent No.: US 11,643,192 B2
(45) Date of Patent: May 9, 2023

(54) AIRCRAFT UNDERCARRIAGE HAVING A BOGEY CARRYING BRAKED WHEELS AND AT LEAST ONE MOTOR-DRIVEN WHEEL

(71) Applicant: SAFRAN LANDING SYSTEMS, Velizy-Villacoublay (FR)

(72) Inventors: Jérôme Gui, Moissy-Cramayel (FR); Jean-Yves Ravel, Moissy-Cramayel (FR); Christophe Devillers, Moissy-Cramayel (FR)

(73) Assignee: SAFRAN LANDING SYSTEMS, Vélizy-Villacoublay (FR)

( * ) Notice: Subject to any disclaimer, the term of this patent is extended or adjusted under 35 U.S.C. 154(b) by 49 days.

(21) Appl. No.: 16/368,577

(22) Filed: Mar. 28, 2019

(65) Prior Publication Data

US 2019/0300161 A1  Oct. 3, 2019

(30) Foreign Application Priority Data

Mar. 29, 2018 (FR) ...................................... 1852756

(51) Int. Cl.
| | | |
|---|---|---|
| *B64C 25/42* | (2006.01) | |
| *B64C 25/36* | (2006.01) | |
| *B64C 25/34* | (2006.01) | |
| *B64C 25/40* | (2006.01) | |
| *B60T 8/17* | (2006.01) | |

(52) U.S. Cl.
CPC .............. *B64C 25/36* (2013.01); *B64C 25/34* (2013.01); *B64C 25/405* (2013.01); *B64C 25/42* (2013.01); *B60T 8/1703* (2013.01)

(58) Field of Classification Search
CPC ....... B60T 8/1703; B60T 8/325; B64C 25/34; B64C 25/42; B64C 25/405; B64C 25/36
See application file for complete search history.

(56) References Cited

U.S. PATENT DOCUMENTS

| | | | |
|---|---|---|---|
| 2005/0231030 A1 | 10/2005 | Frank | |
| 2008/0258014 A1* | 10/2008 | McCoskey | B64C 25/405 244/221 |
| 2009/0108131 A1* | 4/2009 | Lavigne | B64C 25/12 244/102 A |
| 2010/0276535 A1* | 11/2010 | Charuel | B64C 25/405 244/50 |
| 2011/0266388 A1 | 11/2011 | Sorin | |

(Continued)

FOREIGN PATENT DOCUMENTS

| | | |
|---|---|---|
| EP | 2383182 A1 | 11/2011 |
| FR | 2869014 A1 | 10/2005 |

(Continued)

OTHER PUBLICATIONS

Rapport de Recherche Préliminaire mailed Nov. 16, 2018, issued in corresponding French Application No. 1852756 filed Mar. 29, 2018, 2 pages.

*Primary Examiner* — Bradley T King

(74) *Attorney, Agent, or Firm* — Christensen O'Connor Johnson Kindness PLLC

(57) ABSTRACT

A bogey undercarriage having at least two axles, each carrying at least two wheels, wherein at least one of the axles carries a wheel fitted with a rotary drive device and no brake device, while the other wheels are provided with brake devices and no movement devices is provided. A braking method applied to such an undercarriage is also provided.

7 Claims, 2 Drawing Sheets

(56) References Cited

U.S. PATENT DOCUMENTS

| | | | |
|---|---|---|---|
| 2013/0112805 A1 | 5/2013 | Cox | |
| 2015/0301531 A1* | 10/2015 | Gama-Valdez | B64C 25/34 |
| | | | 701/3 |
| 2015/0353190 A1* | 12/2015 | Jaber | B64C 25/46 |
| | | | 701/3 |
| 2016/0016661 A1* | 1/2016 | Howell | B60T 8/00 |
| | | | 701/3 |
| 2016/0039519 A1* | 2/2016 | Didey | F16H 1/06 |
| | | | 244/103 S |
| 2016/0200428 A1* | 7/2016 | Morris | B64C 25/34 |
| | | | 244/50 |
| 2016/0347290 A1* | 12/2016 | Jiao | F16D 61/00 |
| 2016/0355256 A1* | 12/2016 | Gama-Valdez | B60T 8/1703 |
| 2019/0127053 A1* | 5/2019 | Ravel | B64C 25/34 |

FOREIGN PATENT DOCUMENTS

| | | | | |
|---|---|---|---|---|
| GB | 2572161 A | * | 9/2019 | B64C 25/42 |
| WO | 2009125213 A2 | | 10/2009 | |

* cited by examiner

AIRCRAFT UNDERCARRIAGE HAVING A BOGEY CARRYING BRAKED WHEELS AND AT LEAST ONE MOTOR-DRIVEN WHEEL

TECHNICAL FIELD

Embodiments of the disclosure relate to an aircraft undercarriage having a bogey carrying braked wheels and at least one motor-driven wheel.

BACKGROUND

Document WO 2009/125213 discloses aircraft including undercarriages in which at least some of the wheels are fitted with a rotary drive device (i.e. motor-driven wheels) to enable the aircraft to move on the ground without using main engines. Various configurations have been proposed for those motor-driven wheels.

For aircraft of large size having at least three main undercarriages such as the A340-600 or the A380, proposals are made in Document EP 2 383 182 to have the motor-driven wheels carried by a first group of undercarriages and the braked wheels carried by a second group of undercarriages. A static load distributor device acting between the undercarriages serves to load the braked wheels during a stage of braking, and the motor-driven wheels during a stage of moving.

On aircraft that have only two main undercarriages, it is not possible to specialize the main undercarriages so that they carry only braked wheels or only motor-driven wheels. The motor-driven wheels may then be carried by the nose undercarriage at the front of the aircraft. Nevertheless, such a configuration requires some minimum static load to be taken up by the nose undercarriage, which implies having a forward center of gravity for the aircraft. If such a configuration cannot be envisaged, it is then necessary to have motor-driven wheels carried by the main undercarriages. For aircraft in which the main undercarriages have only two wheels (A320, B737), each of the wheels then needs to be fitted both with a brake device and with a drive device, which turns out to be complex and in practice difficult to design given drastic constraints on available space.

Embodiments of the disclosure relate more particularly to aircraft of, for example, intermediate size provided with main undercarriages each having a bogey and carrying at least two axles, such as the A350 or the B777. Document US 2013/0112805 discloses that wheels can be fitted thereto having both a brake device and a drive device. Nevertheless, as already mentioned, such wheels are complex.

SUMMARY

The disclosure seeks to propose a bogey undercarriage in which the wheels provide the aircraft with braking and with independent movement.

In order to achieve this object or others, there is provided a bogey undercarriage in some embodiments having at least two axles, each carrying at least two wheels, wherein at least one of the axles carries a wheel fitted with a drive device and no brake device, and a wheel provided with a brake device and no movement device, the other wheels being fitted with a brake device and no movement device.

Naturally, the wheels are placed on the undercarriages in such a manner that the configuration of the braked wheels and of the motor-driven wheels is symmetrical about a vertical plane of symmetry of the aircraft.

Given the number of wheels per undercarriage (e.g., at least four), it is possible for wheels to be specialized in moving the aircraft without excessively compromising the braking capability of the aircraft.

Thus, and in an embodiment suitable for use with a four-wheel bogey undercarriage, the disclosure proposes providing the undercarriage with one wheel having a movement device and three other wheels that are braked wheels. Two wheels of the aircraft are thus specialized in moving the aircraft on the ground, while the other six wheels of the main undercarriages are dedicated to braking the aircraft. Naturally, the arrangement of the brake is asymmetric on each undercarriage, such that applying the same braking setpoints to all three brakes of an undercarriage would lead to a twisting torque being generated on the leg of the undercarriage. In one embodiment, the brakes are controlled in such a manner as to minimize or even eliminate such asymmetry, at least for ordinary braking below a given braking threshold. This type of control can be implemented only so long as the requested braking remains below a given threshold. Above that threshold, it is accepted in some embodiments that the braking becomes asymmetric, in order to improve braking performance. In one or more embodiments, in response to a braking setpoint, braking begins with the braked wheels carried by the axle(s) carrying braked wheels only, and then once those wheels have reached a maximum braking level, braking is applied by the braked wheel carried by the axle that also carries the motor-driven wheel.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
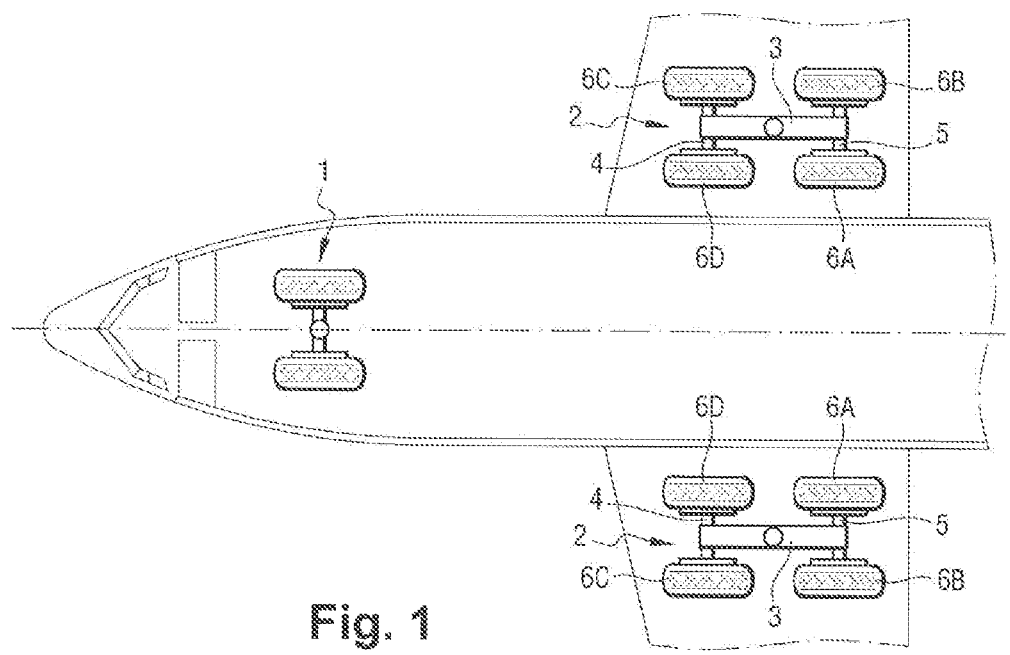
FIG. 1 is a diagrammatic view of one representative example of landing gear of an aircraft having two main undercarriages each with a four-wheel bogey, carrying motor-driven wheels and braked wheels in accordance with the disclosure.

In an embodiment of the disclosure, as shown in FIG. 1, the disclosure applies to an aircraft having a nose undercarriage 1 and main undercarriages 2 with bogeys, each comprising a rocker beam 3 carrying two axles, namely a front axle 4 and a rear axle 5. In this example, and in accordance with an aspect of the disclosure, the rear axle 5 carries a wheel 6A fitted with a rotary drive device (e.g., a motor-driven wheel), and a wheel 6B fitted with a brake device (e.g., a braked wheel), while the front axle 4 carries two wheels 6C and 6D each fitted with a brake device. In this example, the motor-driven wheel 6A is arranged on the inside. In this embodiment, the wheels are arranged on the undercarriages symmetrically about a vertical plane of symmetry of the aircraft. This arrangement enables specialized wheels to be used. In other words, wheels can be used that are much simpler than two-function wheels, while nevertheless preserving significant braking capability.

In some embodiments, only six out of eight wheels are braked, thereby reducing the deceleration capability of the aircraft by 25% relative to an aircraft having braked wheels only. Nevertheless, this loss is not penalizing since the requested braking performance is still easily achievable with only six braked wheels. In addition, it is always possible to use the drive device of the motor-driven wheel for generating braking, in addition to the braking generated by the braked wheels.

Nevertheless, in order to take account of certain severe braking circumstances that require considerable capability for absorbing energy (in particular when aborting takeoff while fully loaded), it is always possible to redesign the energy absorption capability of conventional brakes (by substantially 33% in the above situation) in order to have the nominal energy absorption capability of an undercarriage fitted with four braked wheels. In some embodiments, it is possible to increase the volume of the brake disk (also referred to as the heat sink) in order to enable more energy to be absorbed per brake. It is thus possible to propose main undercarriages having wheels that are specialized without penalizing the capability of the aircraft for absorbing energy, providing the brakes are redesigned.

Figure 2:
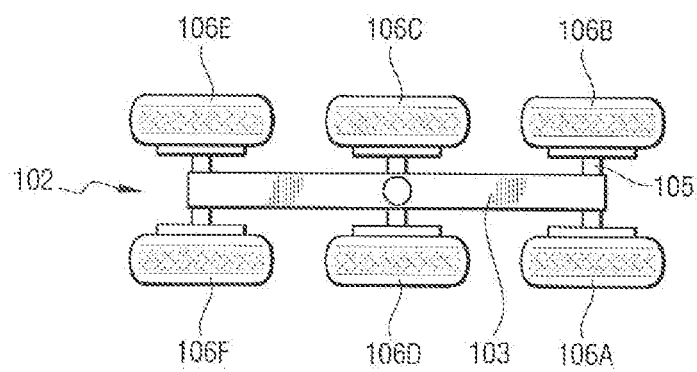
FIG. 2 is a diagrammatic view of one representative example of a main undercarriage having a six-wheel bogey, carrying motor-driven wheels and a braked wheel in accordance with the disclosure.

In another embodiment of the disclosure, as shown in FIG. 2, the main undercarriage 102 has a six-wheel bogey, including one motor-driven wheel 106A mounted on the rear axle together with one braked wheel 106B, and four braked wheels 106C, 106D, 106E, and 106F carried by the other two axles. With one motor-driven wheel per undercarriage, braking capability is reduced by 16.7% if conventional brakes are used. Nevertheless, it is possible to overdimension the brakes (by, e.g., 20%) in order to return to the nominal braking capability of an undercarriage as fitted with braked wheels only.

Figure 3:
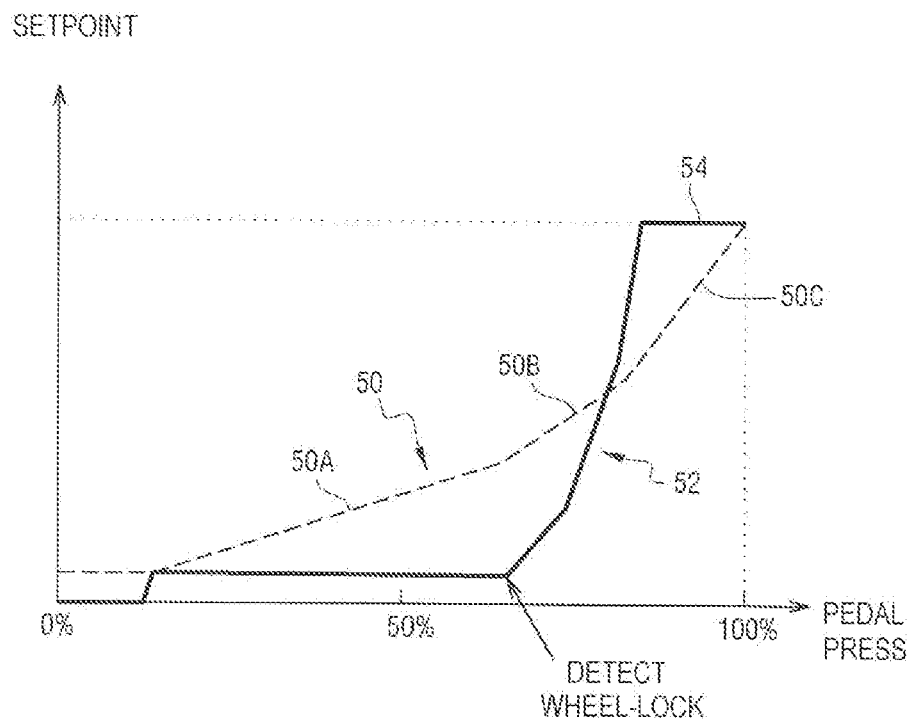
FIGS. 3 and 4 are graphs plotting firstly the generation of a braking control setpoint for the braked wheel carrying by the axle carrying the motor-driven wheel, and secondly the generation of a braking control setpoint for the other braked wheels of the undercarriage in accordance with one or more embodiments of the disclosure.
Figure 4:
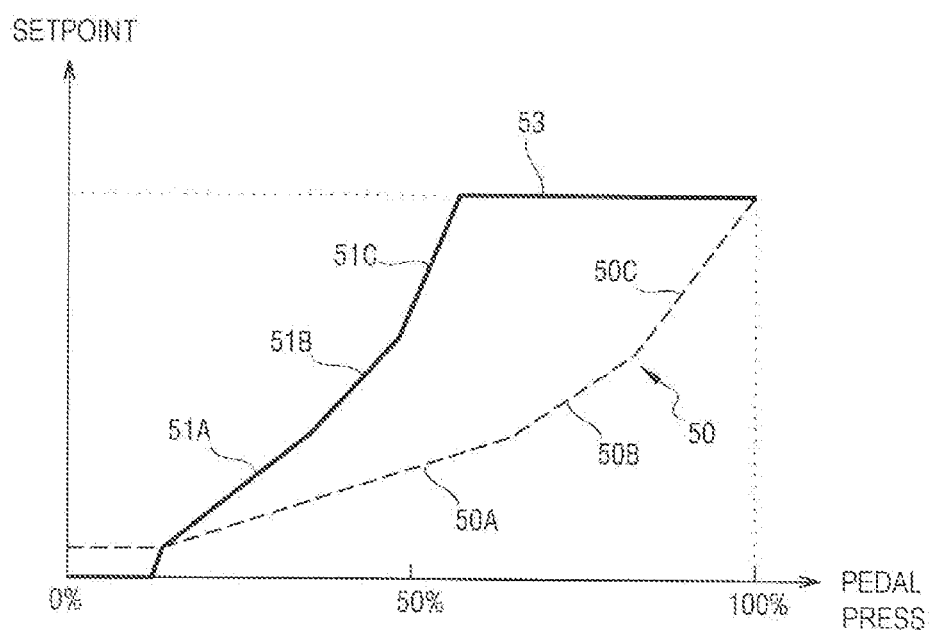

In both embodiments shown, the arrangement of the brakes is asymmetric on each undercarriage, such that applying the same braking setpoints to all of the brakes on an undercarriage would lead to a twisting torque being generated on the leg of the undercarriage. In one embodiment, the brakes are controlled so as to minimize or even eliminate this asymmetry, at least for ordinary braking below a given braking threshold. For this purpose, and in one representative implementation of the disclosure as shown in FIGS. 3 and 4, the braking setpoint 50 generated by the pilot pressing on the brake pedals, or by a braking computer, is interpreted differently in order to calculate two distinct braking control setpoints 51 and 52. More precisely, FIG. 3 shows the second braking control setpoint 52 for the braked wheels 6B carried on the same axle as the motor-driven wheel 6A, while FIG. 4 shows the first braking control setpoint 51 for the braked wheels 6B carried by the other axle(s).

The principle is to apply braking only to the braked wheels carried by the axle(s) carrying braked wheels, so long as such braking is sufficient. Such braking is naturally symmetrical. The braked wheels carried by the axle that also carries the motor-driven wheel is used only in addition if the requested braking is too great to be provided by the other braked wheels, or in order to take over from a braked wheel that has started to become locked.

After a first stage in which the braking control setpoints 51 and 52 are zero so long as no contact has been detected between the brake actuator and the brake heat sink, the first braking control setpoint 51 increases with the braking setpoint 50 with a profile following that of the braking setpoint 50, multiplied by a first coefficient, for example by a coefficient of 1.5 for a four-wheel bogey or by a coefficient of 2 for a six-wheel bogey. Of course, other coefficients can be used. In the example shown, there can be seen three successive slopes 51a, 51b, and 51c corresponding to the slopes of the braking setpoint 50. The increase in the first braking control setpoint 51 continues until reaching a threshold 53. By its very nature, this braking is symmetrical and, in practice, is often sufficient.

If the threshold 53 is reached, i.e. if a maximum level of braking is reached for the braked wheels in question, and if stronger braking is needed, one of the wheels braked in this way in response to the first braking control setpoint 51 will start locking. This locking, which is the result of the wheel losing grip given the braking torque imparted thereto, is detected so as to cause braking to be applied by the braked wheels 6B, 106B carried by the axle that also carries the motor-driven wheels 6A, 106A, with this braking being additional to the braking already applied. For this purpose, the second braking control setpoint 52 for this braked wheel 6B, 106B begins to increase as from locking being detected using a profile following that of the braking setpoint 50 multiplied by a second coefficient, for example equal to four for a four-wheel bogey and to six for a six-wheel bogey. The increase in the second braking control setpoint 52, therefore takes place more quickly than the increase in the first braking setpoint 51 and it continues until reaching a threshold 54. Applying this additional braking makes the overall braking on each of the undercarriages asymmetric, while nevertheless remaining symmetrical for the aircraft as a whole. Nevertheless, this asymmetry is transient. Of course, in some embodiments, other coefficients can be used so long as the second coefficient is greater than the first coefficient.

It will be understood that the brake control described herein may include, in some embodiments, logic for implementing the technologies and methodologies described herein. This logic of the brake control can be carried out in either hardware or software, or a combination of hardware and software. In an example, the functionality of the brake control could be implemented by special purpose hardware-based computer systems or circuits, etc., or combinations of special purpose hardware and computer instructions. In some embodiments, the one or more modules includes one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

In an embodiment, the brake control includes a microprocessor and a memory storing logic modules and/or instructions. In an embodiment, the brake control includes one or more ASICs having a plurality of predefined logic components. In an embodiment, the brake control include one or more FPGA having a plurality of programmable logic components. In an embodiment, the brake control includes combinations of circuits and computer program products having software or firmware instructions stored on one or more computer readable memories that work together to cause a device to perform one or more methodologies or technologies described herein. In an embodiment, the brake control includes hardware circuits (e.g., implementations in analog circuitry, implementations in digital circuitry, and the like, and combinations thereof) for carrying out the functionality described herein.

It will be appreciated that one or more aspects of the methods set forth herein can be carried out in a computer system. In this regard, one or more program elements are provided, which are configured and arranged when executed on a computer to carry out brake control. In one embodiment, the one or more program elements may specifically be configured to perform the steps of: in response to a braking setpoint, braking with the braked wheels carried by the axle(s) carrying braked wheels only; and in response to reaching a maximum level of braking by the wheels carried by the axle(s) carrying braked wheels only, applying additional braking using the braked wheel carried by the axle that also carries the motor-driven wheel. In other embodiments, the one or more program elements may specifically be configured to perform the steps of claims 5-6.

The one or more program elements may be installed in memory, such as computer readable storage medium. The computer readable storage medium may be any one of the computing devices, engines, modules, instruments, analyzers, units, etc., described elsewhere herein or another and separate computing device, engines, modules, instruments, analyzers, units, etc., as may be desirable. The computer readable storage medium and the one or more program elements, which may comprise computer-readable program code portions embodied therein, may further be contained within a non-transitory computer program product.

As mentioned, various embodiments of the present disclosure may be implemented in various ways, including as non-transitory computer program products, computer readable instructions, etc. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, optical disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. Other non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM) of any rate, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

In some embodiments, one or more computer-readable storage media is provided containing computer readable instructions embodied thereon that, when executed by one or more computing devices (contained in or associated with the one or more modules), cause the one or more computing devices to perform one or more steps of the method described in relation to FIGS. 3 and 4. Of course, in other embodiments, one or more of these method steps can be implemented in digital and/or analog circuitry or the like.

The disclosure is not limited to the description above, but on the contrary covers any variant coming within the ambit defined by the claims. For example, although the braking asymmetry is eliminated or attenuated herein by generating distinct braking control setpoints, any other technique could be used, such as for example using techniques or methods for modifying the distribution of load on the wheels, so as to reduce the load on the motor-driven wheel, and thus on the braked wheel that is carried by the same axle, while adding load to the other braked wheels. Modifying the distribution of load could for example include moving the pivot of the bogey on the undercarriage, so as to bring the pivot closer to the axle carrying braked wheels, or indeed an actuator installed between the undercarriage and the bogey to exert thrust on the bogey beside the axle carrying braked wheels only.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An aircraft comprising:
    at least one undercarriage; and
    a brake control,
    wherein the at least one undercarriage comprises:
        at least two axles, each carrying at least two wheels, wherein at least one of the at least two axles carries a motor-driven wheel fitted with a rotary drive device and no brake device, and also a braked wheel fitted with a brake device and no drive device, the other wheels of the at least two axles being braked wheels, and
    wherein the brake control is configured to:
        in response to a braking setpoint, cause the braked wheels carried by the axle(s) carrying braked wheels only to be braked; and
        in response to reaching a maximum level of braking by the wheels carried by the axle(s) carrying braked wheels only, cause the braked wheel carried by the axle that also carries the motor-driven wheel to be braked.

2. The aircraft according to claim 1, wherein the brake control includes one or more circuits configured to control the braked wheels.

3. The aircraft according to claim 1, wherein the brake control includes a computing device and a memory, the memory storing instructions, that when executed by the computing device, cause the brake control to control the braked wheels such that:
    in response to the braking setpoint, cause the braked wheels carried by the axle(s) carrying braked wheels only to be braked; and
    in response to reaching the maximum level of braking by the wheels carried by the axle(s) carrying braked wheels only, cause the braked wheel carried by the axle that also carries the motor-driven wheel to be braked.

4. The aircraft according to claim 1, wherein the brake control is configured to, in response to a braking setpoint, generate a first braking control setpoint for the braked wheels carried by the axle(s) that carry only braked wheels, and then, when these wheels reach a maximum level of braking, generate a second braking control setpoint for the braked wheels carried by the axle that also carries the motor-driven wheel.

5. The aircraft according to claim 4, wherein the brake control is configured to generate the first braking control setpoint by multiplying the braking setpoint by a first coefficient, and is configured to generate the second braking control setpoint by multiplying the braking setpoint by a second coefficient greater than the first coefficient.

6. The aircraft according to claim 1, wherein the at least two axles carry four wheels, including one motor-driven wheel fitted with a rotary drive device, and three braked wheels each fitted with a brake device.

7. The aircraft according to claim 1, wherein the at least two axles carry six wheels, including one motor-driven wheel fitted with a rotary drive device, and five braked wheels each fitted with a brake device.

* * * * *